United States Patent [19]

Beyer et al.

[11] Patent Number: 4,917,350

[45] Date of Patent: Apr. 17, 1990

[54] GASKETLESS AIR DAMPER

[75] Inventors: Barry C. Beyer, Greenfield; Thomas M. Pendergrass, Rushville, both of Ind.

[73] Assignee: American Standard Inc., New York, N.Y.

[21] Appl. No.: 381,607

[22] Filed: Jul. 18, 1989

[51] Int. Cl.⁴ .................... F16K 31/04; F16K 1/22
[52] U.S. Cl. ................ 251/129.11; 251/248; 251/283; 251/305
[58] Field of Search ............ 251/305, 129.11, 283, 251/306, 248

[56] References Cited

U.S. PATENT DOCUMENTS

| | | | |
|---|---|---|---|
| 2,945,667 | 7/1960 | Bibbo et al. | 251/173 |
| 4,246,918 | 1/1981 | Dean | 251/305 X |
| 4,266,753 | 5/1981 | Okada | 251/305 |
| 4,301,833 | 11/1981 | Donald, III | 137/521 |
| 4,401,260 | 8/1983 | Grant | 251/129.11 X |
| 4,469,305 | 9/1984 | Baumann | 251/305 |
| 4,646,964 | 3/1987 | Parker et al. | 236/49 |
| 4,840,114 | 6/1989 | Bauer et al. | 251/306 X |
| 4,840,349 | 6/1989 | Peter et al. | 251/129.11 |

FOREIGN PATENT DOCUMENTS 1236709  3/1967  Fed. Rep. of Germany ...... 251/306

OTHER PUBLICATIONS

Contracting Business/Apr. 1989, by Jim Wheeler, Trane Introduces Varitrac ®.

Primary Examiner—Arnold Rosenthal
Attorney, Agent, or Firm—William J. Beres; William O'Driscoll

[57] ABSTRACT

A gasketless air damper includes a cylindrical sleeve having an inwardly protruding integral seal ridge. A circular blade damper disposed for rotation in the sleeve has integral oppositely oriented edge seals that aerodynamically interact with airflow through the damper and which, in a closed position, provide for a tight gasketless seal between the damper blade and the seal ridge integrally formed in the damper sleeve.

6 Claims, 2 Drawing Sheets

GASKETLESS AIR DAMPER

BACKGROUND OF THE INVENTION

The present invention relates to a damper for modulating the flow of air through room air ducts in a building ventilation system.

With more particularity, this invention relates to a damper having an aerodynamic gasketless damper blade that provides for a tight metal to metal seal and for constant torque to accomplish stable damper operation at high airflow velocities.

Comfort quality is a common problem in buildings such as those having offices in which only one thermostat is used to control the temperature in several different rooms or spaces. Individuals in sunny rooms may often be too hot while individuals in shaded or windowless rooms are often too cold. The lack of responsiveness of such previous "single zone" building heating ventilation and air conditioning systems to different temperature needs in different discrete spaces is the major failure of such systems.

Buildings in which such single zone systems are found are typically designed with cost in mind. Solutions to the comfort problems associated with single zone systems include the conversion of existing single zone systems to a variable air volume (VAV) system or the installation of a variable air volume heating, ventilating and air conditioning system in the first instance. However, VAV systems employ equipment and controls which are often too costly to allow for their installation in the first instance and conversion to VAV systems can likewise be expensive. As a result, buildings with constant volume heating, ventilating and air conditioning systems are very common and although such systems cost less, they do not provide the comfort and performance of a VAV system with respect to discrete spaces having differing comfort conditioning needs.

The need continues to exist for building heating. ventilating and air conditioning systems and components which offer VAV performance, control and comfort yet which at least to some extent employ less expensive constant volume heating, ventilating and air conditioning equipment. Among the needs of a system offering VAV comfort but otherwise employing less costly single zone heating. ventilating and air conditioning equipment is an airflow modulating damper which, among other things, is quiet, provides a tight mechanical seal with low leakage and which does not employ discrete gasketing or seals which are capable of becoming loose or worn with time.

SUMMARY OF THE INVENTION

It is an object of the present invention to provide a blade type air damper which eliminates the noise and vibration associated with previous circular or elongated elliptical blade dampers.

It is a further object of the present invention to provide an air damper which is rotatable through 90° so as to allow for stable airflow modulation, without damper rattle, and which eliminates the unstable damper control associated with air dampers having blades that are limited to 45° of rotation.

It is further an object of the present invention to provide an air damper in which slight movements of damper position produce correspondingly small and controlled incremental airflow changes.

It is a primary object of the present invention to provide a rigid air flow modulating damper having tight sealing characteristics that eliminates the need for damper sealing materials or gasketing which typically deteriorates and comes loose over time resulting in damper jamming and/or leakage.

Finally, it is an object of the present invention to provide an aerodynamic blade damper which results in constant torque for stable operation at high air flow velocities and which eliminates the need for keys or linkages which can work loose over time.

These and other objects of the present invention, which will become apparent when the following Description of the Preferred Embodiment and attached drawing figures are considered, are accomplished by an air damper having a single circular damper blade with integral oppositely oriented radiused edge seals about its circumference.

The oppositely oriented edge seals each abut opposite sides of an integral formed sealing ridge within the damper in the damper's closed position. A tight, metal to metal mechanical seal is obtained which results in low leakage and which eliminates the need for gasketing or the use of other discrete sealing materials to accomplish tight airflow shutoff. In fully open and intermediate positions, the oppositely biased blade edge seals aerodynamically interact with air flowing through the damper to provide for essentially constant torque and stable damper operation in the face of high airflow velocities.

DESCRIPTION OF THE PREFERRED EMBODIMENT

Figure 1:
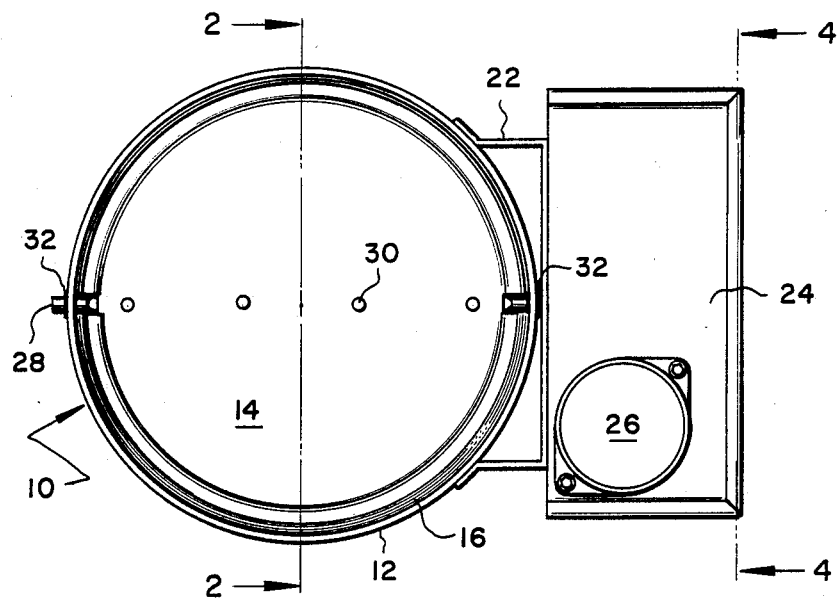
FIG. 1 is an end view of the air damper of the present invention viewed from the upstream or supply end of the damper with the damper blade in the fully closed position.
Figure 2:
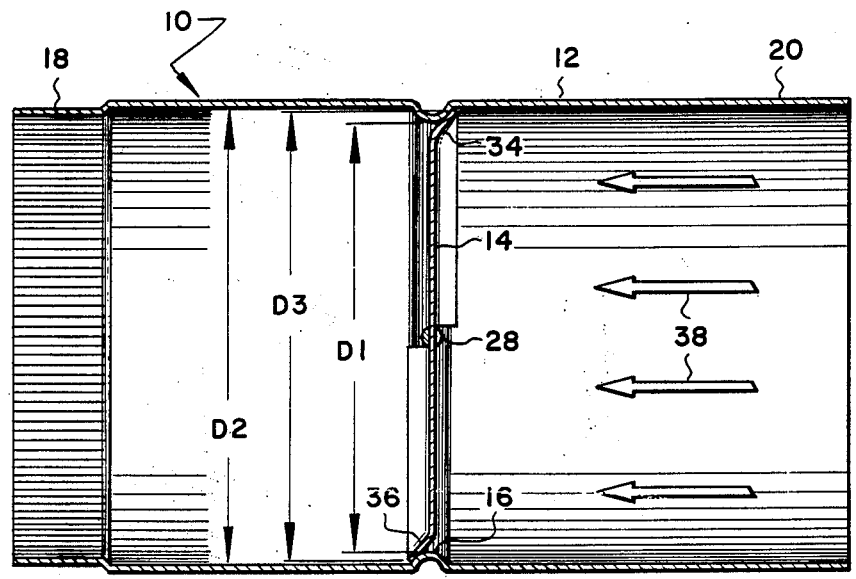
FIG. 2 is a cross sectional view taken along line 2—2 of FIG. 1.

Referring initially to FIGS. 1 and 2, it will be seen that damper 10 is comprised of a cylindrical sleeve 12 in which a circular damper blade 14 is mounted for rotation. Sleeve 12 is a welded aluminum cylinder having an integrally roll formed sealing ridge 16 fabricated approximately midway down its length.

Sealing ridge 16, being integral to sleeve 12 enhances the rigidity of the sleeve and its resistance to deformation thereby minimizing the likelihood of damper blade binding. As a result, the design clearance between blade 14 and sleeve 12 can be reduced as compared to previous more deformable sheet metal damper assemblies not employing a structurally integral sealing ridge. Ridge 16 defines a circular flow path of a diameter D1 through which air passing through Damper 10 is constrained to flow. Diameter D1 is smaller than the inside diameter D2 of sleeve 12.

A first end 18 of sleeve 12 is crimped and configured for insertion into commonly used circular sheet metal ducting. The opposite end 20 of sleeve 12 is configured to receive an inserted portion of such common building ductwork which is formed, in essence, identically to crimped first end 18 of damper 10.

Attached to damper 10 by a mounting bracket 22 is a control and drive box 24 which, among other things, houses damper blade drive gearing and supports damper blade drive motor 26. Damper blade 14 is circular and is mounted for rotation within sleeve 12 on rod 28. Rod 28 preferably includes a flat portion so that damper blade 14, which has an essentially flat face, is capable of being rigidly yet conveniently attached to actuator rod 28 such as by means of rivets 30.

Rod 28 penetrates sleeve 12 and is ensconced in bushings 32 for near frictionless rotation therein. It will be noted that rod 28 penetrates seal ridge 16 of sleeve 12 so that the axis about which damper blade 14 rotates lies generally within a plane defined by seal ridge 16. As a result, in the closed position, as illustrated in FIG. 2, the face of blade 14 lies in a plane coincident with the plane passing through the seal ridge 16.

Blade 14 includes aerodynamic edge seals 34 and 36 which are preferably integrally formed on damper blade 14. Edge seals 34 and 36 are oppositely oriented with respect to the face of the damper blade so that the upstream biased edge rotates into the airflow stream as it passes through damper 10 while the downstream biased edge rotates in a downstream direction. The downstream direction of air flow through damper 10 is indicated by arrows 38 in the drawing figures.

In the closed damper position illustrated in FIG. 2, upstream biased edge 34 of blade 14 abuts the upstream edge of seal ridge 16 while downstream biased edge 36 abuts the downstream side of seal ridge 16. It will be noted that the outside diameter D3 of blade 14 is slightly less than the inside diameter D2 of sleeve 12 but exceeds the diameter D1 of the airflow area defined by seal ridge 16. Therefore, in the closed position there are essentially no gaps through which air can bypass blade 14 as are typically found in other circular or elliptical blade dampers unless such dampers employ discrete seal materials.

As blade 14 is rotated toward a full open position, in which it has been rotated 90°, aerodynamic edges 34 and 36 interact with the flow of air through damper 10 with the result that essentially constant torque is transmitted to the damper motor 26 through rod 28 and the drive gears. This ensures stable, non-vibratory damper blade operation even in high velocity air flow applications particularly as compared to elliptical damper blades which are, by design, constrained to rotate less than 90° (usually a 45° rotation).

Figure 3:
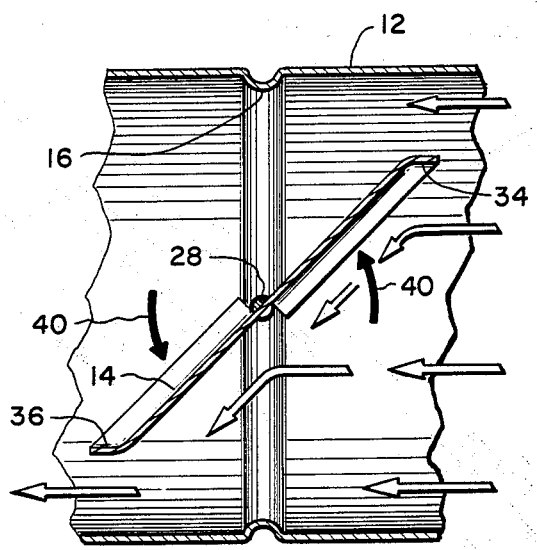
FIG. 3 is a partial cross section of the air damper which is likewise taken along line 2—2 of FIG. 1 but illustrating the damper in a partially open position.

The direction of the torque developed in the damper is indicated by arrows 40 in FIG. 3 and it will be appreciated that such torque will remain essentially constant, due to the aerodynamic nature of the blade, as the damper blade is rotated. Essentially vibration free operation in all damper blade positions, from closed to fully open, is thereby accomplished. This is in contrast to prior blade dampers that are entirely flat and which induce vibration in the damper and which cause airflow disruption, particularly in the face of high velocity airflow.

As is indicated in FIG. 2, damper blade 14, by virtue of oppositely oriented edge seals 34 and 36 comes into tight abutting contact with opposite side of seal ridge 16 when damper blade 14 is in the closed position. Blade 14 is preferably a unitary sheet metal piece with edge seals 34 and 36 being integral oppositely oriented aerodynamically formed portions on opposite halves thereof. The seal accomplished within damper 10 is thus preferably a metal to metal seal and provides for a relatively very tight, gapless shutoff of air flow through damper 10 as compared to earlier damper designs.

Note should be made that in the closed position the area exposed to airflow, on the half of blade 14 on which the upstream facing edge seal is located, is slightly larger than the area so exposed on the other half of the damper blade (by virtue of the shielding of a portion of the downstream oriented edge seal by seal ridge 16). This causes a slight closing/sealing pressure to be developed on the upstream face of blade 14 which further facilitates the development of a tight, gapless seal.

Because of the results achieved by the creation of a tight, gapless seal, no discrete gasketing or common practice to reduce airflow leakage in air dampers. This is extremely advantageous in that such discrete gasketing or seal material tends typically to deteriorate and come loose over time with the result that such dampers become leaky and may, in fact, be jammed and/or become unbalanced by the degradation and shedding of such materials.

Figure 4:
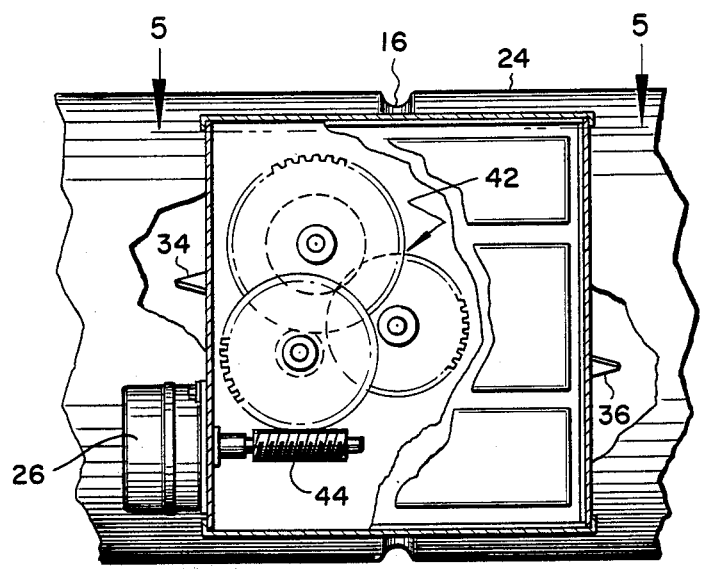
FIG. 4 is a view taken along line 4—4 of FIG. 1 illustrating the motor and drive gear arrangement of the damper.
Figure 5:
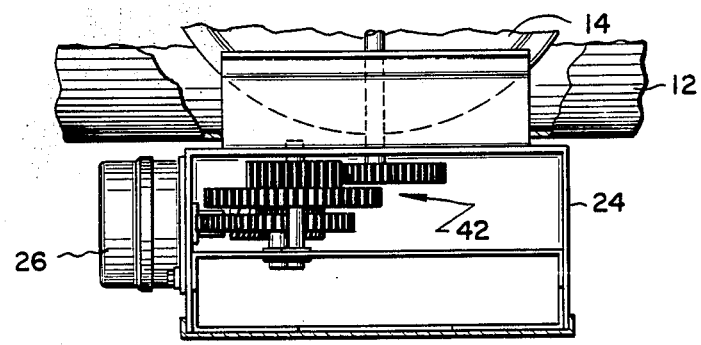
FIG. 5 is a view taken along line 5—5 of FIG. 4.

Referring additionally now to FIGS. 4 and 5, it will be appreciated that motor 26 causes the rotation of blade 14 through the interaction of gear group 42. Motor 26 is preferably an AC electric motor capable of being driven to precisely control damper position through the operation of gear group 42. Gear group 42 is disposed within enclosed box 24 for the purpose of protecting the gear group from exposure to debris and contaminants which might effect their operation.

Gear group 42 preferably includes a worm gear 44 molded directly to the shaft of motor 24 to eliminate gear slippage and to reduce the "slop" associated with straight gear drives. The worm gear drive together with aerodynamic edge seals 34 and 36 greatly reduce noise and wear-producing damper vibration when compared with prior dampers. Not shown are the motor power leads or damper control circuitry which are likewise disposed in housing 24.

While the damper of the present invention has been disclosed in terms of its preferred embodiment, it will be appreciated that modifications and alternatives exist with respect to the invention which fall within its scope. Therefore, the scope of the present invention is to be limited only by the language of the claims which follow.

What is claimed is:

1. An air damper comprising:
   a cylindrical sleeve, said sleeve having an integrally formed inwardly protruding circumferential seal ridge which defines a generally circular air flow path through said damper;
   a rod penetrating said sleeve through the plane defined by said seal ridge;
   a plurality of gears operatively connected to said rod;
   a motor operatively connected to said gears; and
   a generally circular damper blade mounted for rotation on said rod within said sleeve and having a generally flat face portion, said blade having an overall diameter greater than the diameter of the air flow pat defined by said seal ridge and said blade having first and second edge seals, said edge seals being integrally formed portions of said blade which extend away from the plane of said face portion of said blade in opposite directions to aerodynamically interact with air flowing through said damper so that essentially constant torque is transmitted through said rod irrespective of the position of said blade relative to air flow through said damper and so that when said damper is closed, one of said edge seals is disposed generally upstream of said face portion of said blade and abuts directly against a first side of said seal ridge and the other of said edge seals is disposed generally downstream of said face portion of said blade and abuts directly against the other side of said seal ridge, said downstream one of said edge seals being at least partially shielded from air flowing into said damper by said seal ridge.

2. The damper according to claim 1 further comprising means for housing said plurality of gears, said means for housing being penetrated by said rod and being attached to said sleeve.

3. An air damper comprising:
- a sleeve, said sleeve having a circular cross section and defining an inwardly protruding seal ridge, said seal ridge being an integral continuous ridge disposed around the inner circumference of said sleeve and defining a circular flow area, through said damper, of a predetermined diameter;
- an actuator rod, said rod rotatably penetrating said seal ridge of said sleeve;
- a circular damper blade, said blade being a unitary piece attached to said rod for rotation therewith and having an outside diameter greater than the diameter of said air flow area defined by said seal ridge, said blade further having a generally flat face portion and first and second edge seals, said edge seals being integral edges of said piece and being formed for aerodynamic interaction with air flowing through said damper, said first edge seal being skewed from said flat face portion and being oriented upstream with respect to said seal ridge so as to sealingly abut the upstream side of said seal ridge when said damper is closed and said second edge seal being skewed from said flat face portion and being oriented downstream with respect to said seal ridge so as to sealingly abut the downstream side of said seal ridge when said damper is closed so that when said damper is closed to air flow, a portion of said second edge seal is at least partially shielded from air flow within said damper by said seal ridge and an essential gapless barrier to air flow through said sleeve is created, in the absence of discrete seal material; and
- means for causing the rotation of said blade within said sleeve to modulate air flow through said damper.

4. The air damper according to claim 3 wherein said means for causing the rotation of said blade comprises a motor and gear means for conveying motive power from said motor to said rod so that when said motor operates said rod and said blade rotate within said sleeve to modulate the flow of air therethrough.

5. The air damper according to claim 4 wherein said blade is mounted for rotation about an axis which lies in a plane defined by said inwardly protruding seal ridge.

6. The air damper according to claim 5 further comprising means for housing said gear means, said means for housing being attached to said sleeve and being penetrated by said rod and said gear means including a worm gear molded to the driveshaft of said motor.

* * * * *